(12) United States Patent
Törmänen et al.

(10) Patent No.: US 8,072,190 B2
(45) Date of Patent: Dec. 6, 2011

(54) PERMANENT MAGNET GENERATOR CONTROL

(75) Inventors: Pasi Törmänen, Vaasa (FI); Dejan Schreiber, Nürnberg (DE)

(73) Assignee: The Switch High Power Converters Oy, Vaasa (FI)

( * ) Notice: Subject to any disclaimer, the term of this patent is extended or adjusted under 35 U.S.C. 154(b) by 413 days.

(21) Appl. No.: 12/301,763

(22) PCT Filed: May 18, 2007

(86) PCT No.: PCT/FI2007/000135
§ 371 (c)(1),
(2), (4) Date: Feb. 20, 2009

(87) PCT Pub. No.: WO2007/135223
PCT Pub. Date: Nov. 29, 2007

(65) Prior Publication Data
US 2011/0037442 A1 Feb. 17, 2011

(30) Foreign Application Priority Data
May 22, 2006 (FI) ...................................... 20060499

(51) Int. Cl.
*H02P 9/00* (2006.01)
(52) U.S. Cl. ................ 322/44; 322/24; 322/28; 322/59; 322/89; 310/189; 310/200
(58) Field of Classification Search ............. 322/24, 322/28, 44, 59, 89; 310/189, 200
See application file for complete search history.

(56) References Cited

U.S. PATENT DOCUMENTS

| 4,677,365 A | * | 6/1987 | Yang ................................. 322/90 |
| 5,483,111 A | * | 1/1996 | Kuznetsov ................... 310/12.21 |
| 5,594,322 A | * | 1/1997 | Rozman et al. .................. 322/10 |

(Continued)

FOREIGN PATENT DOCUMENTS
JP  3-98498A  4/1991

(Continued)

OTHER PUBLICATIONS

Patil, K.V. et al. "Application of STATCOM for Damping Torisional Oscillations in Series Compensated AC Systems" IEEE Transactions on Energy Conversion, vol. 13, No. 3, Sep. 1998, pp. 237-243.

(Continued)

*Primary Examiner* — Quyen Leung
*Assistant Examiner* — John K Kim
(74) *Attorney, Agent, or Firm* — Birch, Stewart, Kolasch & Birch, LLP

(57) ABSTRACT

A method of and a system for controlling a permanent magnet AC generator (10), wherein the generator is provided with stator windings and permanent magnets in the rotor and wherein the generator is connected to a drive unit (50), wherein the generator is further provided with a semiconductor converter provided with AC output connected to the generator output and a DC link for controlling the output voltage of the generator, and the converter is further provided with filter means for filtering the output of the converter so that a filtered output of the converter is fed to the generator output.

9 Claims, 3 Drawing Sheets

U.S. PATENT DOCUMENTS

| | | | |
|---|---|---|---|
| 5,594,630 | A | 1/1997 | Baker |
| 5,929,537 | A * | 7/1999 | Glennon .................. 307/46 |
| 6,777,846 | B2 * | 8/2004 | Feldner et al. ............. 310/200 |
| 6,812,586 | B2 * | 11/2004 | Wacknov et al. ............ 290/52 |
| 6,838,860 | B2 * | 1/2005 | Huggett et al. ............. 322/46 |
| 6,850,426 | B2 * | 2/2005 | Kojori et al. ............... 363/123 |
| 6,919,711 | B2 * | 7/2005 | Haydock et al. ............ 322/24 |
| 7,085,145 | B2 * | 8/2006 | Sheehy et al. ............... 363/44 |
| 2002/0110007 | A1 | 8/2002 | Kalman et al. |
| 2003/0057926 | A1 * | 3/2003 | Huggett et al. ............. 322/46 |
| 2003/0126060 | A1 * | 7/2003 | Lof et al. .................... 705/36 |
| 2003/0222459 | A1 * | 12/2003 | Harris et al. ................ 290/28 |
| 2005/0242783 | A1 * | 11/2005 | Nakagawa et al. .......... 322/28 |
| 2006/0273765 | A1 * | 12/2006 | Mellor et al. ............... 322/46 |
| 2011/0037442 | A1 * | 2/2011 | Tormanen et al. .......... 322/44 |

FOREIGN PATENT DOCUMENTS

| | | |
|---|---|---|
| JP | 2000-125569 A | 4/2000 |
| WO | WO-03/079529 A1 | 9/2003 |

OTHER PUBLICATIONS

Twining, E. et al. "Voltage Compensation in Weak Distribution Networks Using a D-STATCOM." The Fifth International Conference on Power Electronics and Drive Systems, 2003, pp. 178-183, abstract, and figure 1.

Kling, W.L. et al. "Wind Turbines as Power Plants" Workshop on Wind Power and the Impacts on Power Systems, 2002.

* cited by examiner

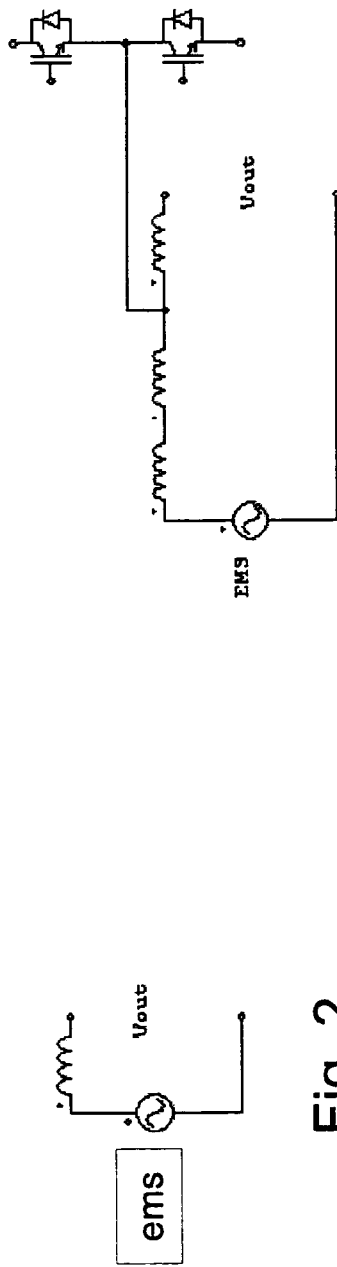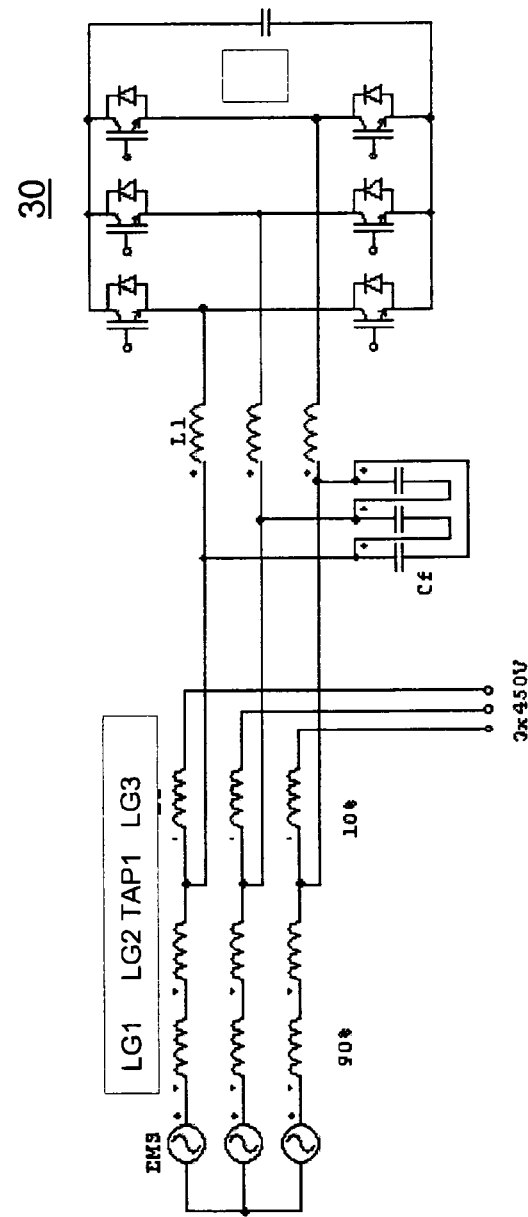
Fig. 2
Fig. 3
Fig. 4

PERMANENT MAGNET GENERATOR CONTROL

FIELD OF THE INVENTION

The present invention relates to a permanent magnet synchronous generator control.

Especially the present invention relates to a method of controlling a permanent magnet synchronous generator and a system for controlling a permanent magnet synchronous generator. Preferably the present invention is used as a ship's auxiliary power supply or corresponding power supply.

PRIOR ART

Motor—generator sets, typically diesel engine—synchronous generator sets, are well known equipments for power supply on ships, especially as auxiliary power supplies, UPS (Uninterruptible Power Supply) and so on. The synchronous generator is generally provided with external excitation. The generator output voltage and frequency have to be constant. The frequency is controlled via motor speed, (motor revolution), and in this way the active generator power is controlled if the generator is connected to the AC voltage grid. Generator output and load voltage control are available due to excitation control via generator external excitation.

In the case of the short circuit on the load side, the generator has according to safety regulations to able to produce minimum three times higher current as the rated one.

Permanent magnet (PM) generators can be used instead of synchronous generators with external excitation. When permanent magnet generators are used, no external excitation and thus no external excitation power is needed, and thus the generator efficiency is higher than the generator efficiency of traditional generators. The disadvantage of the permanent magnet generators is that permanent magnet excitation can not be controlled, and therefore the generator output voltage and the load voltage cannot be controlled so that they remain constant.

SUMMARY OF THE PRESENT INVENTION

The object of the present invention is to eliminate the drawbacks of prior-art solutions and to achieve permanent magnet generator control that will make it possible to control the generator output voltage.

Another object of the present invention is to achieve a system wherein the rating and size of the permanent magnet generator may be minimized.

A further object of the present invention is to achieve a system wherein the number of the components in the control circuit can be minimized and the electrical circuit may be done as simple as possible.

In the present invention the synchronous permanent magnet generator control is improved the use of an additional three phase power converter consisting of a semiconductor switch bridge connected to the output of the generator and a DC capacitor coupled to the converter DC circuit. An output filter may be connected to the generator output in order to achieve sinusoidal converter output voltage.

The present invention is in detail defined in the attached claims.

The rated converter power is related to the PM generator construction. Such construction has benefits compared with traditional solution, especially the lower weight and size of the generator and higher efficiency.

BRIEF DESCRIPTION OF THE DRAWINGS

In the following, preferred embodiments of the present invention will be described in detail by reference to the drawings, wherein FIG. 2 is a PM generator simplified equivalent circuit, FIG. 3 presents the connection, wherein the converter is connected on the tap winding of the pm generator, FIG. 4 presents a simplified filter construction.

DETAILED DESCRIPTION OF THE PREFERRED EMBODIMENTS

Figure 1:
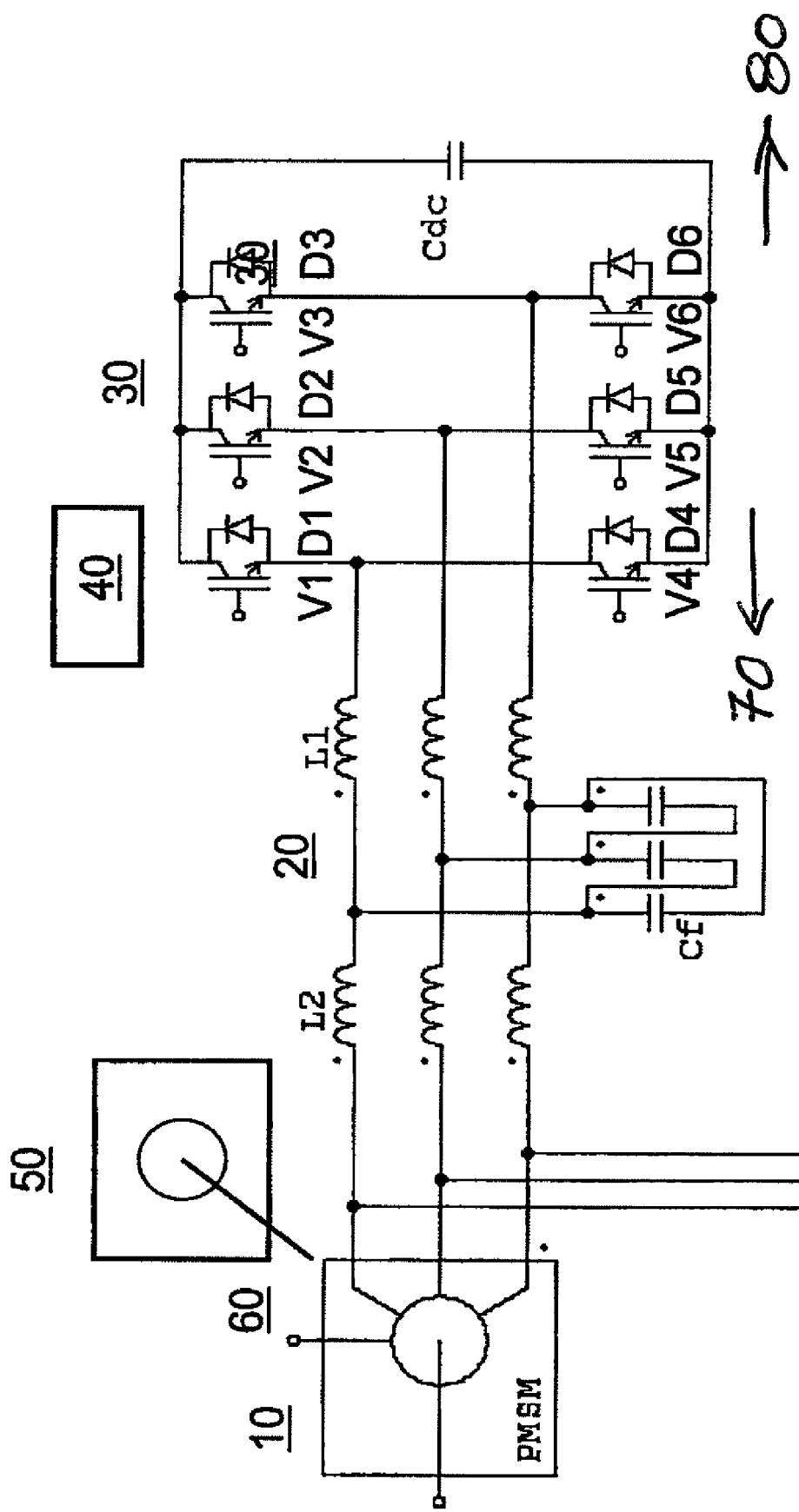
FIG. 1 presents the PM generator voltage control via additional reactive power converter.

FIG. 1 presents a diesel engine—permanent magnet generator apparatus for a ship's auxiliary power supply producing a three phase 450 V AC output voltage $U_U$, $U_V$, $U_W$. The apparatus comprises a three-phase synchronous PM generator 10 with stator windings and a permanent magnet rotor and providing a three phase output voltage. The generator is connected via a common shaft 60 to a diesel engine 50 operating as a drive unit for the generator.

The PM generator apparatus is further provided with an additional three phase power converter controlling the PM generator output voltage. Its AC output is connected to the PM generator output GENOUT and consists of a full wave converter bridge 30 and a control unit 40. A DC link capacitor $C_{DC}$ is coupled on the converter DC side 80. The apparatus is further provided with a converter output filter 20 at the converter AC output for filtering the converter three-phase AC output voltage in order to provide a sinusoidal voltage and current. The DC side 80 has no other connections than the DC link capacitor $C_{DC}$.

The converter bridge is a full-wave bridge with pulse-width-modulated semiconductor switches V1 to V6, such as IGBTs, in upper and lower arms and flywheel diodes D1 to D6 connected in inverse-parallel with the semiconductor switches. The semiconductor switches V1 to V6 are controlled with pulse-width modulation by means of a PWM control in the control unit 40.

The filter 20 is a three phase choke-capacitance filter structure L1, Cf, L2 having a serial coupling of chokes L1 and L2 and the capacitor unit coupled between them in each phase. The filtering can also be based only on L1 choke, without choke L2 and capacitor Cf. The converter 30 can produce, take and control the reactive power from the generator 10 by means of the control unit 40.

In this way the generator output voltage and the load voltage $U_U$, $U_V$, $U_W$ can be controlled and kept constant during the different load conditions. Rated converter power is related to the PM generator 10 construction, and it is one fraction of the rated generator power, in the range of 30% to 50%. Such construction has the benefits, compared with traditional solution (synchronous generator with external excitation), such as lower generator weight and size, and higher efficiency.

The circuit according to the present invention can have additional benefits if additional control strategy is applied.

Short circuit current is by permanent magnet generator 10 limited by the relative high internal stator inductances. Therefore, the demand of three times short circuit current in the ratio to the rated current is very relevant to the PM generator production costs. The short circuit generator current can be reduced, (for example on two times rated current), when the additional converter circuit is controlled to supply current at short circuit conditions, in the 3. quadrant, (reactive current), up to value of the generator rated current. In that case, the load short circuit current will be three times rated current, and the generator short circuit current will be only two times rated current. (Load current=generator current+converter current).

An additional converter operational feature such as this makes it possible to achieve a compact PM generator construction.

For the converter operation at short circuit conditions on the load side 70, an active power for the covering of converter power losses is needed. The power source for such active power can be a fraction of remaining load voltage at short circuit conditions, (for example 10% of the generator voltage). Another solution will be from the DC link capacitor $C_{DC}$, which can be dimensioned for power losses recovering for the time of short circuit duration.

Taking in account the PM generator's simplified one-phase equivalent circuit, FIG. 2 consists of the generator's winding LGEN and the EMS (electromotoric source). The total circuit can be significant simplified. If we take in the PM generator winding one tap per phase, we will have the circuit as illustrated in FIG. 3.

In FIG. 3 the converter 30 is connected to the tap TAP1 in the PM generator winding.

In this way, even at short circuit at the generator terminals, (zero voltage at the load and the generator) tap voltage will be minimum 10% if the tap is in the position 9:1 of the internal inductance. At the same time, necessary converter filter chokes L1 will be integrated in the three generator windings LG1, LG2, LG3 in each phase, FIG. 4, with the tap TAP1 between the second and third windings LG2 and LG3. Here, winding LG3 replaces choke L2 in FIG. 1.

Figure 5:
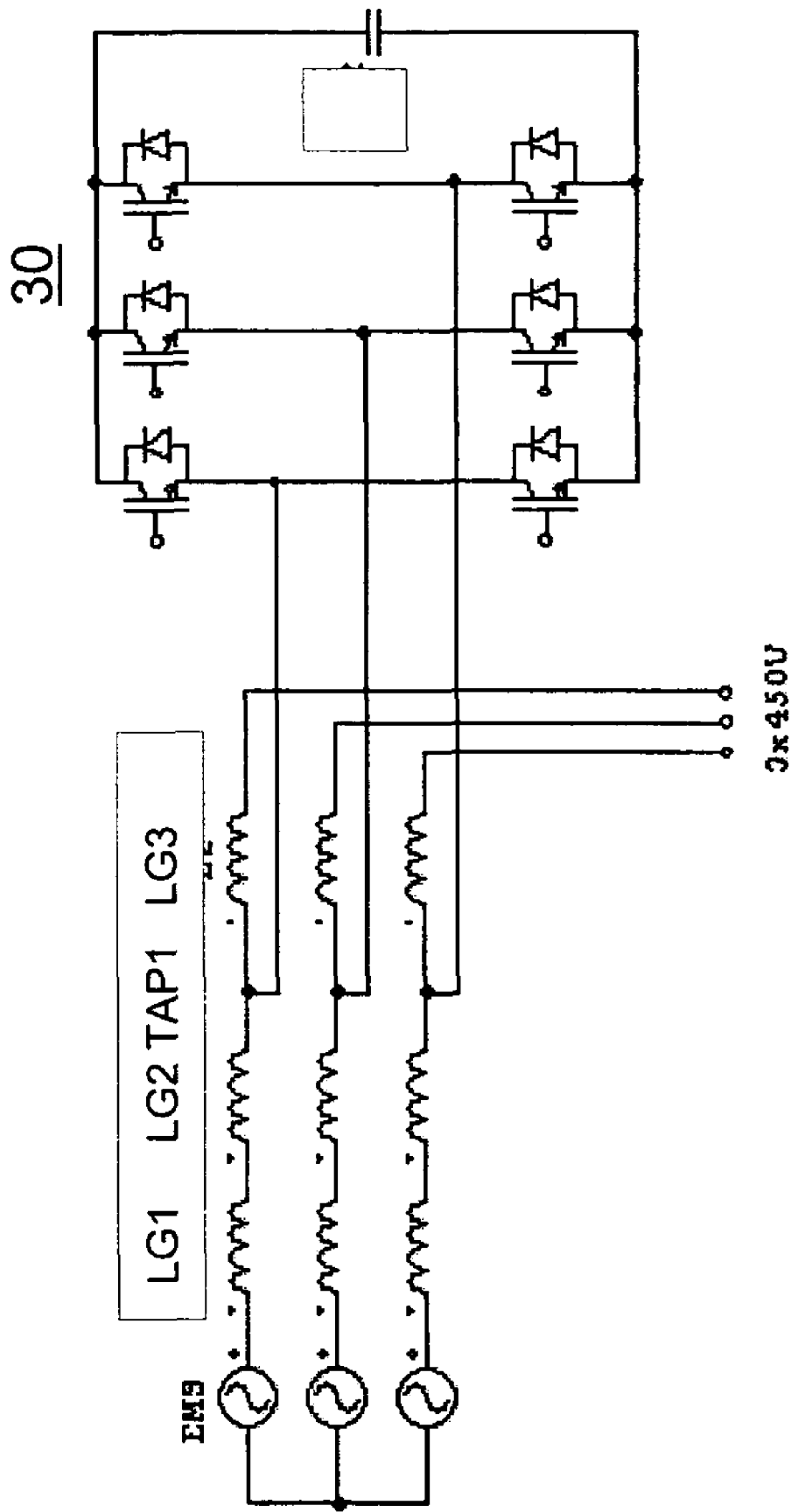
FIG. 5 is a preferred circuit for PM generator and converter for voltage control according to the present invention.

If the remaining induction value of choke L2 is high enough, the circuit can be significant simplified, see FIG. 5, where the filter is not present at all.

It is obvious to the person skilled in the art that the embodiments of the invention are not restricted to the examples presented above, but that they can be varied within the scope of the following claims. Besides IGBTs, the fully controllable semiconductor switches used may also consist of other fully grid-controlled semiconductor switches, i.e. switches that can be turned on and off, such as transistors or MOSFETs.

The invention claimed is:

1. A method of controlling a permanent magnet AC generator (10) in a power supply system, wherein the generator is provided with stator windings and permanent magnets in a rotor, and wherein the generator is connected to a drive unit (50),
   the method comprising the steps of:
   controlling an output voltage of the AC generator (10) with a semiconductor converter (30) having an AC output connected to an output of the AC generator (10) and a DC link capacitor ($C_{DC}$) for controlling an output voltage of the AC generator (10), and
   filtering an output voltage of the converter with filter means (20) so that an output voltage of the converter (30) fed to the AC generator (20) is filtered,
   wherein a converter filter choke coupling is integrated in windings (LG1, LG2, LG3) of the generator with taps (TAP1) between the windings,
   wherein the filter means (20) is totally integrated inside the generator, and none of the filter means (20) is disposed external of the generator.

2. The method as defined in claim 1, wherein the converter (30) includes circuits which are controlled to supply current at short circuit conditions to add to a supply of the current from the generator.

3. The method as defined in claim 1, wherein at short circuit conditions, further comprising:
   attaining active power on a load side of the converter (30) for covering of converter power losses from a remaining load voltage.

4. The method as defined in claim 1, further comprising:
   coupling the DC link capacitor ($C_{DC}$) on a DC side (80) of the converter, and,
   at a time of a short circuit condition, providing active power on a load side (70) of the converter (30) from the DC link capacitor ($C_{DC}$) for covering a loss of power of the converter,
   wherein the DC link capacitor ($C_{DC}$) is dimensioned for recovering the loss of power during a duration of the short circuit condition.

5. A system for controlling a permanent magnet AC generator (10) having stator windings (LG1, LG2, LG3) and permanent magnets in rotor thereof, the generator (10) being connected to a drive unit (50),
   wherein the system includes:
   a semiconductor converter (30) provided with an AC output connected to an output of the generator (10) and a DC link capacitor ($C_{DC}$) for controlling an output voltage of the AC generator (10), and
   filter means (20) for filtering an output of the converter (30), so that an output of the converter (30) fed to the AC generator (10) is filtered,
   wherein a converter filter choke coupling is integrated in windings (LG1, LG2, LG3) of the generator with taps (TAP1) between the windings,
   wherein the filter means (20) is totally integrated inside the generator, and none of the filter means (20) is disposed external of the generator.

6. The system as defined in claim 5, wherein circuits of the converter (30) are controlled to supply current at short circuit conditions to add to a supply of current from the generator.

7. The system as defined in claim 5, wherein the generator is a three phase permanent magnet generator.

8. The system as defined in claim 5, wherein an opposite end of each of the three chokes (L1) is directly connected to the tap (TAP1) associated with each of three phases of the generator.

9. The system as defined in claim 5, wherein the converter (30) is a full-wave bridge with semiconductor switches (V1 to V6), with flywheel diodes (D1 to D6) connected in inverse-parallel with the semiconductor switches (V1 to V6), and
   wherein the semiconductor switches (V1 to V6) are controlled by means of a control unit (40).

* * * * *

UNITED STATES PATENT AND TRADEMARK OFFICE
CERTIFICATE OF CORRECTION

| | |
|---|---|
| PATENT NO. | : 8,072,190 B2 |
| APPLICATION NO. | : 12/301763 |
| DATED | : December 6, 2011 |
| INVENTOR(S) | : Pasi Tormanen et al. |

It is certified that error appears in the above-identified patent and that said Letters Patent is hereby corrected as shown below:

ON THE TITLE PAGE:

At item (73), Assignee, change:

"(73) Assignee: The Switch High Power Converters Oy, Vaasa (FI)"

to

--(73) Assignees: The Switch High Power Converters Oy, Vaasa (FI);
Semikron Elektronik GmbH & Co. KG, Nurnberg (DE)--.

Signed and Sealed this
Eighteenth Day of September, 2012

David J. Kappos
*Director of the United States Patent and Trademark Office*